United States Patent
Skluzak et al.

(10) Patent No.: US 8,572,835 B2
(45) Date of Patent: Nov. 5, 2013

(54) AUTOMOTIVE GLASS-SETTING TOOL

(76) Inventors: Dell Skluzak, Lakewood, CO (US); David Whisenhunt, Mount Hope, KS (US)

(*) Notice: Subject to any disclaimer, the term of this patent is extended or adjusted under 35 U.S.C. 154(b) by 276 days.

(21) Appl. No.: 12/915,483

(22) Filed: Oct. 29, 2010

(65) Prior Publication Data

US 2011/0099795 A1  May 5, 2011

Related U.S. Application Data

(60) Provisional application No. 61/256,031, filed on Oct. 29, 2009.

(51) Int. Cl.
*B23Q 7/00* (2006.01)

(52) U.S. Cl.
USPC ...... 29/559; 29/281.1; 248/206.2; 248/205.5; 269/21

(58) Field of Classification Search
USPC ......... 29/559, 428, 281.1; 269/21; 248/205.5, 248/206.2, 363
See application file for complete search history.

(56) References Cited

U.S. PATENT DOCUMENTS

| | | | | | |
|---|---|---|---|---|---|
| 1,400,573 A | * | 12/1921 | Stader | ............................ | 294/186 |
| 1,863,897 A | * | 6/1932 | Cloppert | ...................... | 29/426.5 |
| 2,014,535 A | * | 9/1935 | Maca | ................................ | 29/256 |
| 2,157,001 A | * | 5/1939 | Morley | ....................... | 248/205.6 |
| 2,209,424 A | * | 7/1940 | Shipman et al. | .............. | 294/186 |
| 2,273,662 A | * | 2/1942 | Ralston | ............................ | 211/11 |
| 2,430,996 A | * | 11/1947 | Rush | .............................. | 254/50.1 |
| 2,434,387 A | * | 1/1948 | Brandt | .......................... | 224/323 |
| 2,557,434 A | * | 6/1951 | Hoverder | ....................... | 248/544 |
| 2,949,334 A | * | 8/1960 | Amerpohl | ........................ | 108/46 |
| 3,020,017 A | * | 2/1962 | Watson | ........................ | 248/205.8 |
| 3,333,750 A | * | 8/1967 | Porter | ............................. | 224/320 |
| 3,446,499 A | * | 5/1969 | Ringler | ........................... | 271/267 |
| 3,620,524 A | * | 11/1971 | Czompi | ............................ | 269/31 |
| 3,912,317 A | * | 10/1975 | Ohnaka | ........................... | 294/186 |
| 4,199,852 A | * | 4/1980 | Ayers et al. | ..................... | 29/239 |
| 4,280,861 A | * | 7/1981 | Schwartz | ...................... | 156/382 |
| 4,335,534 A | * | 6/1982 | Allred | ............................. | 43/27.4 |
| 4,580,751 A | * | 4/1986 | Panzer | ........................ | 248/205.8 |
| 4,593,947 A | * | 6/1986 | Yocum | .......................... | 294/187 |
| 4,648,572 A | * | 3/1987 | Sokol | .......................... | 248/206.2 |
| 4,727,815 A | * | 3/1988 | Miller | ............................. | 108/42 |
| 4,836,482 A | * | 6/1989 | Sokol | .......................... | 248/206.3 |
| 4,998,711 A | * | 3/1991 | Borg | ............................... | 269/21 |
| 5,025,747 A | * | 6/1991 | Grayson | ....................... | 114/362 |
| 5,087,005 A | * | 2/1992 | Holoff et al. | ............... | 248/205.8 |
| 5,135,206 A | * | 8/1992 | Martinez | ........................ | 269/21 |
| D348,581 S | * | 7/1994 | Starr, IV | ....................... | D6/574 |
| 5,351,841 A | * | 10/1994 | Belokin et al. | ............. | 211/88.01 |
| 5,390,837 A | * | 2/1995 | Ruffolo, Jr. | .................. | 224/482 |
| D357,557 S | * | 4/1995 | Piper | ............................ | D30/133 |
| 5,479,689 A | * | 1/1996 | Schmit et al. | ................ | 29/426.4 |

(Continued)

*Primary Examiner* — David Bryant
*Assistant Examiner* — Bayan Salone
(74) *Attorney, Agent, or Firm* — Donald J. Ersler

(57) ABSTRACT

A glass-setting apparatus may include an upper support arm and a lower support arm. The upper support arm may be attachable to a roof of a vehicle and may have a holding mechanism operable to hold a top edge of a sheet of material. The lower support arm may be attachable to a hood of the vehicle and may have one or more notches along a portion of the lower support arm that is operable to receive a bottom edge of the sheet of material.

12 Claims, 1 Drawing Sheet

(56) References Cited

U.S. PATENT DOCUMENTS

| | | | | |
|---|---|---|---|---|
| 5,525,027 A | * | 6/1996 | Jinno et al. | 414/680 |
| 5,531,496 A | * | 7/1996 | Zbinden et al. | 296/96.21 |
| D375,861 S | * | 11/1996 | Belokin, Jr. | D6/570 |
| 5,593,145 A | * | 1/1997 | Sprayberry | 269/3 |
| 5,639,134 A | * | 6/1997 | Rusch et al. | 294/187 |
| 5,776,506 A | * | 7/1998 | Thomas et al. | 425/12 |
| 5,893,550 A | * | 4/1999 | Lassley | 269/21 |
| 5,909,758 A | * | 6/1999 | Kitamura | 16/406 |
| 5,948,331 A | * | 9/1999 | Beckert et al. | 264/36.21 |
| 5,952,012 A | * | 9/1999 | Thomas et al. | 425/12 |
| 6,039,371 A | * | 3/2000 | Smith | 294/8.6 |
| 6,042,353 A | * | 3/2000 | Thomas et al. | 425/12 |
| 6,101,702 A | * | 8/2000 | Claycomb et al. | 29/426.4 |
| 6,170,894 B1 | * | 1/2001 | Baker et al. | 294/187 |
| 6,234,435 B1 | * | 5/2001 | Yeh | 248/205.5 |
| 6,237,216 B1 | * | 5/2001 | Jin | 29/800 |
| 6,308,923 B1 | * | 10/2001 | Howard | 248/205.5 |
| 6,338,619 B1 | * | 1/2002 | Rusch | 425/11 |
| 6,382,692 B1 | * | 5/2002 | Schmalz et al. | 294/189 |
| 6,453,531 B1 | * | 9/2002 | Krass et al. | 29/268 |
| 6,543,117 B1 | * | 4/2003 | Claycomb et al. | 29/426.4 |
| 6,578,248 B1 | * | 6/2003 | Boldizar | 29/281.5 |
| 6,606,778 B1 | * | 8/2003 | Krass et al. | 29/468 |
| 6,616,800 B2 | * | 9/2003 | Eriksson | 156/714 |
| 6,749,160 B1 | * | 6/2004 | Richter | 248/206.2 |
| 6,962,314 B2 | * | 11/2005 | Hsu | 248/205.5 |
| 7,007,908 B2 | * | 3/2006 | Tsay | 248/309.3 |
| 7,029,255 B2 | * | 4/2006 | Rawlins et al. | 425/12 |
| 7,039,995 B2 | * | 5/2006 | Thompson | 29/281.5 |
| 7,140,854 B2 | * | 11/2006 | Rawlins et al. | 425/12 |
| 7,216,411 B1 | * | 5/2007 | Mayhugh | 29/468 |
| 7,229,059 B1 | * | 6/2007 | Hood | 248/518 |
| 7,243,806 B2 | * | 7/2007 | Kwok | 211/105.3 |
| D552,970 S | * | 10/2007 | Brassard | D8/354 |
| 7,322,092 B2 | * | 1/2008 | Adas et al. | 29/468 |
| 7,381,355 B2 | * | 6/2008 | Rawlins et al. | 264/36.21 |
| 7,503,540 B2 | * | 3/2009 | Hood | 248/537 |
| D591,756 S | * | 5/2009 | Wohlford et al. | D14/452 |
| 7,578,487 B2 | * | 8/2009 | Kaneda et al. | 248/205.8 |
| D599,187 S | * | 9/2009 | Matschina et al. | D8/315 |
| 7,610,666 B2 | * | 11/2009 | Adas et al. | 29/468 |
| 7,618,023 B2 | * | 11/2009 | Ericson | 254/278 |
| 7,628,434 B2 | * | 12/2009 | Bruce et al. | 294/65 |
| 7,686,287 B2 | * | 3/2010 | Dixon et al. | 269/75 |
| 7,818,863 B2 | * | 10/2010 | Maekawa et al. | 29/407.01 |
| 7,878,467 B2 | * | 2/2011 | Chen et al. | 248/206.2 |
| 8,091,843 B2 | * | 1/2012 | Tsai | 248/206.2 |
| D654,493 S | * | 2/2012 | Baumann et al. | D14/253 |
| 8,109,479 B1 | * | 2/2012 | Tsai | 248/206.3 |
| D665,651 S | * | 8/2012 | Richter | D8/354 |
| D665,797 S | * | 8/2012 | Novak | D14/253 |
| 2004/0003488 A1 | * | 1/2004 | Thompson | 29/281.1 |
| 2006/0118503 A1 | * | 6/2006 | Patton | 211/187 |
| 2006/0156533 A1 | * | 7/2006 | Mayhugh | 29/468 |
| 2006/0228506 A1 | * | 10/2006 | Lin | 428/36.91 |
| 2007/0120026 A1 | * | 5/2007 | Chen | 248/205.5 |
| 2008/0116337 A1 | * | 5/2008 | Kaneda et al. | 248/205.8 |
| 2009/0218741 A1 | * | 9/2009 | Winnard | 269/8 |
| 2011/0278406 A1 | * | 11/2011 | Zhadanov et al. | 248/205.5 |

* cited by examiner

AUTOMOTIVE GLASS-SETTING TOOL

CROSS-REFERENCE TO RELATED APPLICATIONS

This application claims the benefit of priority to U.S. provisional patent application No. 61/256,031 filed Oct. 29, 2009, and incorporated herein by reference.

BACKGROUND OF THE INVENTION

The present invention generally relates to automotive repair, and more particularly relates to an automotive glass-setting tool that may allow a single person to set windshield glass onto a vehicle.

Because windshield glass is both heavy and fragile, a person setting windshield glass onto a vehicle must be careful to avoid injuring himself and/or breaking or cracking the windshield glass. Because of that, two people are often required to work together to set the windshield glass. Further, while commercially-available tools are available to assist in setting windshield glass, such tools are often expensive and cumbersome to setup, use and store.

As can be seen, there is a need for a less expensive tool that allows a single person to more easily and ergonomically set windshield glass on a vehicle.

SUMMARY OF THE INVENTION

In one aspect of the present invention, a glass-setting apparatus may comprise an upper support arm attachable to a roof of a vehicle, the upper support arm having a holding mechanism operable to hold a top edge of a sheet of material; and a lower support arm attachable to a hood of the vehicle, the lower support arm having one or more notches along a portion of the lower support arm that is operable to receive a bottom edge of the sheet of material.

In another aspect of the present invention, a method for holding a windshield may comprise attaching an upper support arm to a roof of a vehicle; attaching a lower support arm to a hood of the vehicle; placing a top edge of the windshield on a holding mechanism on the upper support arm; and placing a bottom edge of the windshield on a notch on the lower support arm.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an automotive glass-setting tool that allows for single-person removal and installation of windows of any size in an ergonomic and accurate manner. The automotive glass-setting tool may comprise upper and lower support arms that attach via suction cups to the roof and the hood of a vehicle.

Figure 1:
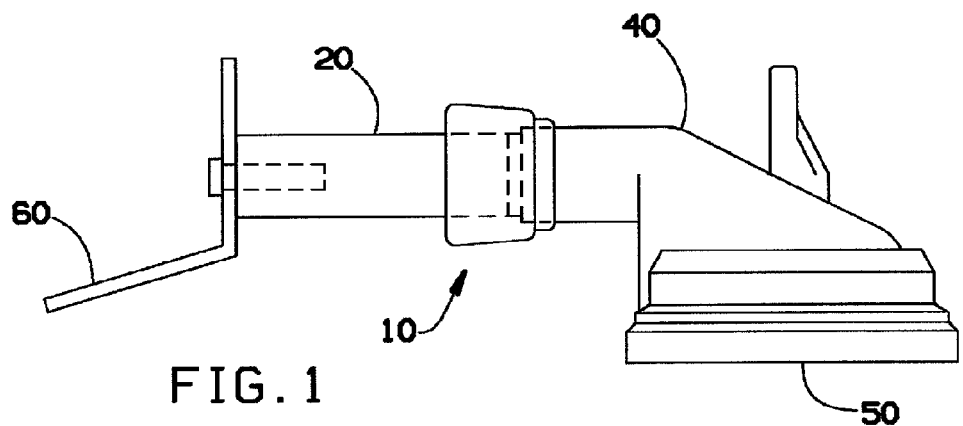
FIG. 1 shows an upper support arm of an automotive glass-setting tool in accordance with an embodiment of the present invention.

Referring now to FIG. 1, an upper support arm 10 may be an L-shaped tool that may comprise an upper extension bar 20 operably coupled to an L-shaped upper suction frame 40. The upper support arm 10 may have an upper suction cup 50 operably coupled to a first end of the upper support arm 10 so that the upper suction cup 50 may be situated approximately in parallel with the upper extension bar 20. The upper support arm 10 may attach to the roof of a vehicle via the upper suction cup 50 so that the upper extension bar 20 may extend down towards the vehicle's hood and in parallel with the plane of the vehicle's windshield. The upper support arm 10 may also have a holding mechanism, such as a bracket 60, that is operably coupled to a second end of the upper support arm 10 opposite the first end. The bracket 60 may be shaped, such as by having an L shape, to hold an edge of a windshield away from the sealant line, and the bracket 60 may be coated to protect against scratching the held windshield.

Figure 2:
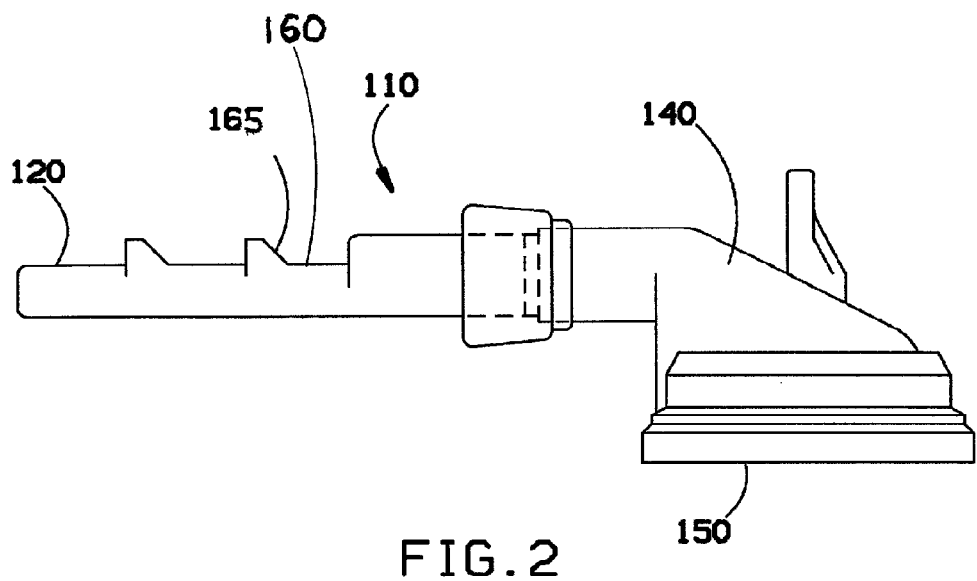
FIG. 2 shows a lower support arm of the automotive glass-setting tool of FIG. 1.

Referring now to FIG. 2, a lower support arm 110 may be an L-shaped tool that may comprise a lower extension bar 120 operably coupled to an L-shaped lower suction frame 140. The lower support arm 110 may have a lower suction cup 150 operably coupled to an end of the lower support arm 110 so that the lower suction cup 150 may be situated approximately in parallel with the lower extension bar 120. The lower support arm 110 may be attached to the hood of the vehicle via the lower suction cup 150 so that the lower extension bar 120 may extend up towards the roof of the vehicle at an angle. The lower extension bar 120 may comprise several notches 160 for holding a bottom edge of the windshield, so that the windshield glass may be held away from the sealant line. The notches 160 may be coated to prevent scratching of the windshield glass, and the multiple notches 160 may allow the lower support arm 110 to accommodate windshields of different sizes. Each notch 160 is preferably terminated with a chamfer 165.

To install a windshield onto a vehicle, top and bottom edges of the windshield may be placed onto the bracket 60 of the upper support arm 10 and one of the notches 160 on the lower support arm 110, respectively, thus keeping the windshield edge away from the urethane sealant line on the frame of the vehicle where the windshield will be set. The user may then place the windshield edge into the urethane sealant line opposite from the support arms 10 and 110. Suction cups may then be applied to the edge of the windshield resting on the support arms 10 and 110 to allow a user to lift the windshield off of the support arms 10 and 110. Once the windshield has been lifted off the support arms 10 and 110, the support arms 10 and 110 may be removed and the windshield may then be precisely placed into the sealant. Alternatively, two sets of upper and lower support arms 10 and 110 may be attached to either side of a windshield. A user may lift the windshield from a set of support arms 10 and 110 on one side, set the windshield, and then lift the windshield from the set of support arms 10 and 110 on the other side to complete setting the windshield.

To remove a windshield from a vehicle, old sealant around the windshield may be cut. The upper and lower support arms 10 and 110 may hold the sides of the windshield that has already been cut out from the sealant to keep the edges of the windshield from rubbing against and possibly damaging the vehicle and also to create a clearance gap to allow a user to continue cutting through old sealant.

The automotive glass-setting tool may be made by using commercially available suction cups and may be manufactured by machining, molding, casting, carving, or other processes. The suction cups may be secured via a pin, screw, adhesives, welding, or any other mechanical fastening system. The bracket 60 may be fastened to the upper arm support via a screw, pin, welding, adhesives, or any other mechanical fastening system. The surfaces of the arms of the tool may be coated with plastic, rubber, felt, or any other non-scratching material.

The upper and lower support arms 10 ad 110 and the bracket 60 may be made of metal, wood, or plastic, and may be placed at various positions on a vehicle frame as long as the suction cups can maintain a solid vacuum and the glass is held securely to the arms. The angle of the bracket 60 may be approximately 100 degrees, but may also be between about 90 and 150 degrees. The bracket 60 may be flexible to accommodate various windshield sizes and windshield frame angles.

While the automotive glass-setting tool is currently described in the context of setting a windshield onto a vehicle, the tool may also be used for any purpose that requires setting a pane of material into a sealant line of a framed area.

It should be understood, of course, that the foregoing relates to exemplary embodiments of the invention and that modifications may be made without departing from the spirit and scope of the invention as set forth in the following claims.

We claim:

1. A glass-setting apparatus comprising:
    an upper support arm includes an upper suction device and a support member, said support member extends from said upper suction device, said suction device is removably attachable to a top surface area of a roof of a vehicle, said support member is operable to hold a top edge of a sheet of material; and
    a lower support arm includes a lower suction device and a lower extension arm, said lower extension arm extends from said lower suction device, said suction device is removably attachable to a top surface of a hood of the vehicle, at least two notches are formed along a portion of said lower extension arm that is operable to receive a bottom edge of the sheet of material, a chamfer is formed on an end of at least one of said at least two notches.

2. The glass-setting apparatus of claim 1, wherein the sheet of material comprises a windshield.

3. The glass-setting apparatus of claim 1, wherein:
    an upper extension arm includes a first end and a second end, said support member is attached to said first end, said second end extends from said upper suction device.

4. The glass-setting apparatus of claim 1, wherein
    said support member has a substantial L-shape, said substantial L-shape having an angle of about 90 degrees to 150 degrees.

5. A method for holding a windshield comprising: attaching an upper support arm to a top surface area of a roof of a vehicle; attaching a lower support arm to a top surface of a hood of the vehicle; placing a top edge of the windshield on a support device extending from said upper support arm; and placing a bottom edge of the windshield on a notch on the lower support arm.

6. The method of claim 5, wherein: the attaching the upper support arm further comprises suctioning the upper support arm to the top surface area of the roof of the vehicle via an upper suction cup; and the attaching the lower support arm further comprises suctioning the lower support arm to the surface area of the hood of the vehicle via a lower suction cup.

7. The method of claim 5, wherein the placing the bottom edge further comprises placing the bottom edge of the windshield on one of a plurality of notches on the lower support arm.

8. A windshield-setting apparatus comprising:
    an upper support arm includes an upper suction device and a support member, said support member extends from said upper suction device, said support member has a substantial L-shape, said suction device is removably attachable to a top surface area of a roof of a vehicle, said support member is operable to support a top edge of the windshield; and
    a lower support arm includes a lower suction device and a lower extension arm, said lower extension arm extends from said lower suction device, said suction device is removably attachable to a top surface of a hood of the vehicle, at least two notches are formed along a portion of said lower extension arm that is operable to receive a bottom edge of the windshield, a chamfer is formed on an end of at least one of said at least two notches.

9. The windshield-setting apparatus of claim 8, wherein:
    an upper extension arm includes a first end and a second end, said support member is attached to said first end, said second end extends from said upper suction device.

10. The windshield-setting apparatus of claim 8, wherein said substantial L-shape having an angle of about 90 degrees to 150 degrees.

11. The glass-setting apparatus of claim 1 wherein:
    a coating being applied to said support member and said at least one notch to prevent scratching of the sheet of material.

12. The windshield-setting apparatus of claim 8 wherein:
    a coating being applied to said support member and said at least one notch to prevent scratching of the windshield.

* * * * *